(12) United States Patent
Fukasawa et al.

(10) Patent No.: US 6,168,644 B1
(45) Date of Patent: Jan. 2, 2001

(54) TITANIUM-BASE POWDERS AND PROCESS FOR PRODUCTION OF THE SAME

(75) Inventors: Eiichi Fukasawa; Satoshi Sugawara, both of Chigasaki (JP)

(73) Assignee: Toho Titanium Co., Ltd., Chigasaki (JP)

( * ) Notice: Under 35 U.S.C. 154(b), the term of this patent shall be extended for 0 days.

(21) Appl. No.: 09/029,752

(22) PCT Filed: Jul. 29, 1997

(86) PCT No.: PCT/JP97/02611
  § 371 Date: Apr. 2, 1998
  § 102(e) Date: Apr. 2, 1998

(87) PCT Pub. No.: WO98/04375
  PCT Pub. Date: Feb. 5, 1998

(30) Foreign Application Priority Data

Jul. 30, 1996 (JP) .................................................... 8-216575

(51) Int. Cl.$^7$ ........................................................ B22F 1/00
(52) U.S. Cl. ............................... 75/343; 75/352; 75/354; 75/363; 423/645
(58) Field of Search ............................. 75/255, 343, 352, 75/369, 363, 612; 423/645

(56) References Cited

U.S. PATENT DOCUMENTS

| | | |
|---|---|---|
| 2,905,547 | * 9/1959 | Yoblin . |
| 3,376,107 | * 4/1968 | Oka et al. . |
| 4,470,847 | * 9/1984 | Hard et al. . |
| 5,520,879 | * 5/1996 | Saito et al. ............................. 419/38 |

FOREIGN PATENT DOCUMENTS

| | | |
|---|---|---|
| 1-139706 | 6/1989 | (JP) . |
| 5-247503 | 9/1993 | (JP) . |
| 5-339606 | 12/1993 | (JP) . |
| 7-76707 | 3/1995 | (JP) . |
| 7-278601 | 10/1995 | (JP) . |

OTHER PUBLICATIONS

E. Fukasawa et al., "Characteristics of High Purity Titanium Powder By HDH Process", Titanium '92, Science and Technology (1993), vol. 1, pp. 919–926.

E. Fukasawa et al., "Characteristics of Low Oxygen Titanium Powder by HDH Process", Titanium and Zirconium (1994), vol. 42, No. 4, pp. 249–251.

* cited by examiner

*Primary Examiner*—Ngoclan Mai
(74) *Attorney, Agent, or Firm*—Oliff & Berridge, PLC

(57) ABSTRACT

Titanium hydride powder with a maximum particle diameter of substantially 150 μm or less, the powder with particle diameters of 10 μm or less being 8% or less by weight, which is produced via step for embrittling a titanium and titanium alloy by hydrogenation, and titanium powder with a maximum particle diameter of which is 150 μm or less, the powder with particle diameters of 10 μm or less being 5% or less by weight. In the powder the oxygen content and the chlorine content are reduced, and the flowability and compactibility are excellent. This powder is particularly suitable for a raw material to produce a sintered titanium or titanium alloy product by the powder metallurgy.

5 Claims, No Drawings

TITANIUM-BASE POWDERS AND PROCESS FOR PRODUCTION OF THE SAME

BACKGROUND OF THE INVENTION

1. Technical Field

This invention relates to titanium hydride powders (including titanium hydride alloy powder, the same shall apply hereinafter), and titanium powders (including titanium alloy powder, the same shall apply hereinafter), and a process for production of the titanium powders.

2. Background Art

Recently, sintered titanium and sintered titanium alloys produced by powder metallurgy come to be widely used in various applications such as refractory metals. These sintered titanium metals and these alloys are usually applied to mechanical parts requiring high tensile strength and elongation. However, these mechanical properties are greatly affected by oxygen content in the metals and these alloys. When the oxygen content exceeds 0.3 wt %, the mechanical properties such as elongation are known to be significantly deteriorated. In consideration of inevitable oxygen contamination during powder metallurgy processes, the oxygen content of titanium powder as the raw material must be 0.15 wt % or less (Refer to R&D Review of TOYOTA CRDL, 26-1(1991)).

The sintered titanium and these alloys need titanium powder and titanium hydride powder with high purity, excellent flowability and compactibility, which powders can be produced by a hydride-dehydride (HDH) process. The HDH process are completed after hydrogenating titanium and its alloy, crushing hydrogenated metals to desired powder size and dehydrogenating its powder in vacuum-heating.

In detail, the HDH process comprises hydrogenating titanium metal or titanium alloy as a raw material at an elevated temperature in hydrogen gas, crushing the lumps of hydrogenated titanium metal or titanium alloy into a powder, with a prescribed particle size, dehydrogenating the powder at an elevated temperature in vacuum, breaking the sintered powders and sizing the powders into a desired range.

Thus obtained powders have an excellent purity and a highly uniform particle size. In addition, when high quality metals are employed as a raw material, high quality powders can be produced in the HDH process. For this reason, the HDH process is considered to be advantageous for producing titanium powders.

The smaller the particle size is, the higher becomes the specific surface area, resulting in higher oxygen content. In considering such characteristics of the titanium powders, a process for obtaining titanium powders with a low oxygen content has been proposed, in which after the particle size of the titanium hydride powder is preliminarily controlled by sieving and removing such that the ratio of the fine particles with a diameter of 63 $\mu$m or less, for example, is limited to a prescribed level in a particle size distribution of the powder, this powder is dehydrogenated to obtain a titanium powder (Japanese Patent Unexamined (KOKAI) Publication No. 247503/93). However, in this process, a large part of the fine particle powder is removed, causing a cost increase.

Flowability and compactibility are essential for the titanium powder and titanium hydride powder in using as a raw material for the powder metallurgy. Therefore, the titanium powder and the titanium hydride powder must satisfy the flowability and compactibility, too. As the titanium powder with both the fine particle size and excellent flowability, Japanese Patent Unexamined (KOKAI) Publication No. 278601/95 discloses a titanium powder with a particle diameter ranging from 5 $\mu$m to 74 $\mu$m and the average particle diameter of 20 $\mu$m or less. However, the titanium powder obtainable by this teaching has the oxygen content approximately in the range from 2000 to 3000 ppm.

The titanium sponge produced by the Kroll process usually contains chlorine of approximately 0.08% by weight because magnesium chloride remains as a by-product in the titanium sponge. Since this chlorine is not completely removed and remains as an impurity in the titanium powder even after the HDH process, pores are formed in the sintered titanium materials as a final product and the fatigue strength is degraded. Accordingly the titanium hydride powder and titanium powder are desired with low chlorine content. Japanese Patent Unexamined (KOKAI) Publication No. 139706/89) discloses a process for removing a residual chlorine by washing the titanium powder after the HDH process.

However, the washing water is essentially required to be an ion exchanged one substantially containing no chlorine and since oxygen contamination in washing is also inevitable, a drying step is essentially required to decrease an occurrence of the oxygen contamination. Thus, it brings a new problem that the drying cost is additionally required and the quality is degraded.

An object of the present invention is to provide titanium hydride powders, titanium powders, and a process for production of the same with maintaining the characteristics, in which the titanium hydride powders and titanium powders present an excellent flowability and compactibility, and in which an oxygen and chlorine content can be reduced simultaneously through this process with high yield.

SUMMARY OF THE INVENTION

A titanium hydride powder according to the present invention is characterized by having a maximum particle diameter of substantially 150 $\mu$m or less, the powder comprising a particle diameter of 10 $\mu$m or less being 8% or less by weight, which is produced via the step for embrittling a titanium or titanium alloy through hydrogenation. The titanium hydride powder thus obtained contains hydrogen of 3.5% to 4.5% by weight.

The expression "substantially 150 $\mu$m or less" herein used means that although there may remain some powders on a sieve of 150 $\mu$m in sieving, such powder is less than 1% by weight in the total powder and 99% or more by weight with a maximum particle diameter of 150 $\mu$m or less(the same shall apply hereinafter).

As previously mentioned, the higher the ratio of the fine powder contained in the titanium hydride powder is, the higher the oxygen content of the titanium powder becomes, which is ascribed to moisture and oxygen in the atmosphere. The study and investigation of the present inventors show that when the titanium hydride powder with particle diameters of 10 $\mu$m or less exceeds 8% by weight, the fine powder is overly increased and as a result, the oxygen content of this titanium hydride powder exceeds 0.15% by weight, resulting that the sintered titanium materials as a final product are deteriorated in mechanical properties. In addition, with the increase of the fine powder, the flowability of the powder is lowered and the compactibility thereof is also lowered under the adverse effect of the oxidized fine powders. Accordingly, it is essentially required for the titanium hydride powder of the present invention that the powder with particle diameters of 10 $\mu$m or less is 8% by weight or less.

It should be noted that the oxygen content of the titanium hydride powder must essentially be 0.15% or less by weight.

When the oxygen content is in this range, the compactibility of the powders and the mechanical properties can be fully satisfied for a sintered titanium or sintered titanium alloy. The powder with particle diameters of 10 μm or less is approximately controlled within a range of 8% or less by weight and preferably 5% or less by weight, depending on the powder properties required for the target sintered product and an established cost thereof.

The chlorine content of the titanium hydride powder of the present invention is preferably 0.06% or less by weight. If the chlorine content exceeds 0.06% by weight, the titanium sintered products by the powder metallurgy has an increased number of enlarged pores and the mechanical properties thereof, such as fatigue strength, tend to be degraded.

Since the chlorine of the titanium hydride powder is localized in a fine powder with particle diameters of 10 μm or less, it is possible to control the initial chlorine content so that the powder with particle diameters of 10 μm or less occupies 8% or less by weight.

The titanium powder of the present invention is obtained by dehydrogenating the titanium hydride powder as mentioned above, with a maximum particle diameter of 150 μm or less, the ratio of powder with particle diameters of 10 μm or less being 5% or less by weight. In such a titanium powder, the oxygen and chlorine content can be maintained in an allowable range and the flowability and compactibility can be guaranteed.

Further, since the powder is angular in shape different from a spheroidized titanium powder obtained by atomizing, the powder reveals an excellent compressibility and a rigid bonding property.

The process for manufacturing a titanium hydride powder of the present invention is characterized in that lumps of the titanium hydride from a titanium or titanium alloy through hydrogenation is mechanically crushed and then classified, so that the powder has a maximum particle diameter of substantially 150 μm or less and the powder with particle diameters of 10 μm or less occupies 8% or less by weight. The above-mentioned hydrogenated powder of the present invention can be obtained by this manufacturing process. The average particle diameter of the titanium hydride powder is preferably 100 μm or less. By defining the upper limit of the average particle diameter to this value, the flowability and compactibility of the powder can be maintained.

A process for manufacturing a titanium powder of the present invention is characterized in that after the dehydrogenation under the vacuum heating, the titanium hydride powder is crushed and then sieved in such a particle size range that the powder has a maximum particle diameter of 150 μm or less and the powder with a particle diameter of 10 μm or less occupies 5% or less by weight.

DETAILED DESCRIPTION OF THE PREFERRED EMBODIMENTS

The titanium hydride powder of the present invention is obtained by the following procedures. The lumps of titanium sponge produced by the Kroll process are charged into a vacuum furnace to avoid an oxygen contamination during hydrogenation. The lumps in the furnace are heated up to 1000° C. and then hydrogenated after feeding hydrogen. The hydrogenated titanium lumps contains hydrogen in the range from 3.5 to 4.5% by weight. The lumps are mechanically crushed, classified and/or sieved to remove fine powders therefrom until a maximum particle diameter is 150 μm or less and the amount of powder with a particle diameter of 10 μm or less occupies 8% or less by weight. For mechanical crushing, a crusher such as ball mill, a vibration mill, etc. can be utilized and for particle size controlling, a classifying equipment such as a circular vibration sieving machine and a flow dividing and classifying machine can be utilized.

The Kroll process is a reduction process for producing titanium metal by reducing titanium tetrachloride with molten magnesium. The titanium sponge used here refers to a porous metallic titanium produced by the Kroll process.

The titanium powder of the present invention is manufactured by charging the titanium hydride powder into a container which is then carried into the vacuum heating furnace for the dehydrogenation, for example, at a temperature of 500 to 900° C. under the vacuum of $10^{-3}$ Torr or less, the resultant lumps of titanium being then mechanically crushed. The titanium powder thus obtained preferably has a maximum particle diameter of 150 μm or less, the powder with particle diameters of 10 μm or less being 5% or less by weight, and more preferably 3% or less by weight.

The titanium powder obtained by dehydrogenating the titanium hydride powder of the present invention as a raw material can be utilized for the powder metallurgical material of high purity with the well-balanced properties by controlling the amount of the powder in the range of a prescribed particle diameter in the whole powder (for example, the oxygen and chlorine content can be reduced, the flowability is excellent and the compactibility is ensured, and so on).

EXAMPLES 1 AND 2

The lumps of titanium sponge with particle diameters of half inch or less were charged into a furnace for producing the hydrogenated titanium sponge with a hydrogen content of 4% by weight. Thereafter, the hydrogenated titanium sponge thus obtained was crushed into the titanium hydride powder with particle diameters of 150 μm or less by a ball-mill.

Then, fine powder was removed with a pneumatic classifier so that the powder with particle diameters of 10 μm or less contained in the titanium hydride powder become 1.6% by weight (See Example 1) and 7.3% by weight (See Example 2). The oxygen content, the chlorine content, the flowability and the compactibility of the obtained titanium hydride powder are shown in Table 1. For comparison, the oxygen content, the chlorine content, the flowability and the compactibility were also evaluated regarding the titanium hydride powder (Comparative Example 1) in which no fine powder with particle diameters of 10 μm or less was removed and the titanium hydride powder (Reference Example) in which the amount of the powder with particle diameters of 10 μm or less was further removed. The result is shown in Table 1.

The amount of the powder with particle diameters of 10 μm or less was measured by the laser diffraction method, and the flowability was measured based on Japanese Industrial Standard (Z2505). A needle was employed to break a powder bridge over the throat in the apparatus for measuring the flowability. The compactibility was measured based on Japanese Standard of Powder Metallurgy (#4-69, Rattler test) with a pellet-like compact by pressing the powder at a pressure of 3 ton/cm$^2$. As shown in Table 1, the titanium hydride powder of the present invention proves that the oxygen content is 0.15% or less by weight, the chlorine content is also reduced to 0.06% or less by weight, the flowability is excellent, the compactibility evaluated by the Rattler test is also excellent. In contrast, in the powder containing fine powders (Comparative example 1), the oxygen content exceeds 0.15% by weight, the chlorine content also reaches 0.08% by weight, and the flowability is too low to be measured. In the Reference Example, the oxygen content was further reduced, and both of flowability and compactibility were excellent. However, the yield of product of the titanium hydride powder of the present invention was 90% or more, while the yield of the product of Reference Example was 60% or less.

TABLE 1

| Ration of the powder occupied under 10 μm (wt %) | Oxygen content (wt %) | Chlorine content (wt %) | Flowability (sec/50 grams) | Weight loss (Compactibility (%)) |
|---|---|---|---|---|
| Example 1 | | | | |
| 1.6 | 0.08 | 0.05 | 97 | 7 |
| Example 2 | | | | |
| 7.3 | 0.14 | 0.06 | 118 | 8 |
| Comparative Example 1 | | | | |
| 9.1 | 0.16 | 0.08 | *none | 11 |
| Reference Example 1 | | | | |
| 0.9 | 0.06 | 0.05 | 55 | 6 | note: "none" means "unmeasurable"

EXAMPLES 3 AND 4

The titanium hydride powders of Example 1 and 2 were charged into a dehydrogenating furnace and heated for dehydrogenation at an elevated temperature in a vacuum condition to obtain the lumps of powder. The lump of titanium powder was crushed by a ball mill to obtain a titanium powder with a maximum particle diameter of 150 μm or less. The oxygen content of the titanium powder was analyzed in the same manner as in Example 1. The result is shown in Table 2. Here, Example 3 and 4 refer to the titanium powders from the titanium hydride powders in Example 1 and 2 of Table 1 as raw materials, respectively. Comparative Example 2 refers to the titanium powder from the titanium hydride powder in Comparative Example 1 of Table 1 as a raw material. The oxygen contents of Example 3 and 4, in which the amounts of the powder with a particle diameter of 10 μm or less is controlled to 5% or less by weight, are 0.12% by weight and 0.15% by weight, respectively, which are equal to or less than the upper limit (0.15% by weight) of the oxygen content. In contrast, in Comparative Example 2, the powder with particle diameters of 10μ less exceeds 5% by weight, and the oxygen content also exceeds 0.15% by weight. Therefore, the powder in Comparative Example 2 is not suitable for a raw material in the powder metallurgy.

TABLE 2

| | Ratio of the powder occupied under 10 μm or less (wt %) | oxygen content (wt %) |
|---|---|---|
| Example 3 | 0.8 | 0.12 |
| Example 4 | 4.3 | 0.15 |
| Comparative Example 2 | 6.8 | 0.21 |

Industrial Applicability

The present invention can be utilized as a raw material for a sintered titanium product manufactured by powder metallurgy, and a process for manufacturing the same.

We claim:

1. A titanium hydride powder and titanium hydride alloy powder characterized with a maximum particle diameter of substantially 150 μm or less, the powder comprising particle diameters of 10 μm or less being 8% or less by weight, the oxygen content being 0.15% or less by weight, and the chlorine content being 0.06% or less by weight.

2. A titanium hydride powder and titanium hydride alloy powder according to claim 1, wherein the powder comprising particle diameters of 10 μm or less is 5% or less by weight.

3. A titanium hydride powder and titanium hydride alloy powder according to claim 1, wherein the hydrogen content is 3.5 to 4.5% by weight.

4. A process for producing the titanium powder and titanium alloy powder, comprising the steps of (a) preparing the titanium hydride powder or titanium hydride alloy powder with a maximum particle diameter of 150 μm or less and the powder comprising particle diameters of 10 μm or less being 8% or less by weight, the oxygen content thereof being 0.15% or less by weight, and the chlorine content thereof being 0.06% or less by weight;

(b) dehydrogenating the lumps of the titanium hydride or the titanium hydride alloy at a temperature of 500 to 900° C. in vacuum, crushing the lumps, and then controlling the particle size thereof;

(c) obtaining the titanium powder or the titanium alloy powder with a maximum particle diameter of 150 μm or less and the ratio of the powder with particle diameters of 10 μm or less being 5% or less by weight.

5. A process for manufacturing the titanium powder and the titanium alloy powder according to claim 4, wherein the oxygen content of the powder is 0.15% or less by weight.

* * * * *